(12) United States Patent
Suga et al.

(10) Patent No.: US 9,645,818 B2
(45) Date of Patent: May 9, 2017

(54) INFORMATION PROCESSING APPARATUS AND CONTROL METHOD OF INFORMATION PROCESSING APPARATUS

(71) Applicant: FUJITSU LIMITED, Kawasaki-shi, Kanagawa (JP)

(72) Inventors: Makoto Suga, Edogawa (JP); Koji Hosoe, Yamato (JP); Akio Tokoyoda, Fuchu (JP); Masatoshi Aihara, Hiratsuka (JP); Yuta Toyoda, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 14/868,452

(22) Filed: Sep. 29, 2015

(65) Prior Publication Data

US 2016/0110193 A1   Apr. 21, 2016

(30) Foreign Application Priority Data

Oct. 16, 2014   (JP) ................................ 2014-211567

(51) Int. Cl.
G06F 12/00   (2006.01)
G06F 9/30   (2006.01)
G06F 11/00   (2006.01)

(52) U.S. Cl.
CPC ............ G06F 9/3001 (2013.01); G06F 11/00 (2013.01)

(58) Field of Classification Search
CPC .... G06F 12/00; G06F 12/0811; G06F 12/126; G06F 13/00
USPC .................................. 711/100, 117, 118, 154
See application file for complete search history.

(56) References Cited

U.S. PATENT DOCUMENTS

| 5,828,860 | A | * | 10/1998 | Miyaoku | G06F 9/30043 711/122 |
|---|---|---|---|---|---|
| 6,195,724 | B1 | * | 2/2001 | Stracovsky | G06F 12/0215 710/107 |
| 6,799,228 | B2 | * | 9/2004 | Mamiya | G06F 3/0611 710/39 |
| 2012/0278530 | A1 | * | 11/2012 | Ebsen | G06F 3/0659 711/103 |
| 2013/0031412 | A1 | | 1/2013 | Iwasaki | |

FOREIGN PATENT DOCUMENTS

JP   2013-030909   2/2013
WO   02/073411   9/2002

* cited by examiner

*Primary Examiner* — Tuan Thai
(74) *Attorney, Agent, or Firm* — Fujitsu Patent Center

(57) ABSTRACT

The information processing apparatus includes an arithmetic processing device configured to output an access request, a storage device configured to store data, a storage control device configured to accept the access request to the storage device from the arithmetic processing device, transfer the accepted access request to the storage device, and acquire a response to the access request from the storage device, and a diagnosis control device configured to send an access request to the storage device to the storage control device in place of the access request to the storage device from the arithmetic processing device, and acquire a response from the storage device via the storage control device.

8 Claims, 9 Drawing Sheets

INFORMATION PROCESSING APPARATUS AND CONTROL METHOD OF INFORMATION PROCESSING APPARATUS

CROSS-REFERENCE TO RELATED APPLICATION

This application is based upon and claims the benefit of priority of the prior Japanese Patent Application No. 2014-211567, filed on Oct. 16, 2014, the entire contents of which are incorporated herein by reference.

FIELD

The embodiments discussed herein are related to an information processing apparatus including a storage device and a control method of an information processing apparatus.

BACKGROUND

There has hitherto been a method by which a processor of an information processing apparatus performs a test by executing a test program as a memory testing method in the information processing apparatus including a memory as instanced by LSI (Large Scale Integration) and other equivalent semiconductor integrated circuits. There is also a method of performing the test, in which, e.g., a controller to start the test sets a command in an instruction queue within the processor. In the case of the instruction queue, the processor on the information processing apparatus accesses the memory via the instruction queue, thereby executing the test. FIG. 1 illustrates a configuration of the information processing apparatus including the memory.

The information processing apparatus in FIG. 1 includes a processor 301, a memory 303 and a controller 304. The processor 301 includes a core 310, and a memory control device 320 that accesses the memory 3. The core 310 includes an instruction queue 311 having a plurality of entries. In FIG. 1, each entry is depicted by a character string "queue". The controller 304 outside the processor 301 can set and read the data in and from the instruction queue 311. The controller 304 sets a command for testing the memory 303 in the instruction queue 311, and starts the test.

The memory control device 320 includes a request queue 321 having a plurality of entries, an access control unit 322 and a reception data control unit 323. The memory control device 320 acquires the command or the data for accessing the memory from a control circuit to control the instruction queue 311 within the core 310, and hands over the command or the data to the access control unit 322. The access control unit 322 acquires the command or the data via the request queue 321, and access the memory 303. The access control unit 322 is in the midst of executing some sort of process, during which the access control unit 322 returns a busy signal A1 to the control circuit of the request queue 321.

During a period for which the busy signal A1 is set ON, the control circuit of the request queue 321 stops handing over the next command or data to the access control unit 322. When the data are handed over to, e.g., the reception data control unit 323 from the memory 303, the access control unit 322 sets OFF the busy signal A1, based on a response signal A2 transmitted from the reception data control unit 323. When the busy signal A1 is set OFF, the control circuit of the request queue 321 hands over the request containing the next command or data to the access control unit 322 and the access control unit 322 executes a next process for the memory 303 upon receiving the next request. As described above, the memory 303 included in the information processing apparatus has hitherto been tested by setting the command or the data in the instruction queue 311 within the processor 310 from the controller 304.

For instance, tests called a load test (termed also a running test), a disturb test and other equivalent tests are performed as the tests of the information processing apparatus including the memory described above. However, the information processing apparatus of recent years involves a complicated behavior of the processor due to mounting a plurality of cores, diversifying a cache, diversifying a function of an interconnect between plural processors, and other equivalent schemes. It is assumed that the disturb test, the load test and other equivalent tests are not easily implemented under control of a program to be executed by the processor or under control of the instruction queue provided within the processor due to the complicated behavior of the processor.

[Patent document 1] International Publication Pamphlet No. WO 2002/073411
[Patent document 2] Japanese Laid-Open Patent Publication No. 2013-30909

SUMMARY

One aspect of the technology of the disclosure is exemplified by an information processing apparatus. The information processing apparatus includes an arithmetic processing device configured to output an access request, a storage device configured to store data, a storage control device configured to accept the access request to the storage device from the arithmetic processing device, transfer the accepted access request to the storage device, and acquire a response to the access request from the storage device, and a diagnosis control device configured to send an access request to the storage device to the storage control device in place of the access request to the storage device from the arithmetic processing device, and acquire a response from the storage device via the storage control device.

The object and advantages of the invention will be realized and attained by means of the elements and combinations particularly pointed out in the claims. It is to be understood that both the foregoing general description and the following detailed description are exemplary and explanatory and are not restrictive of the invention.

DESCRIPTION OF EMBODIMENTS

A circuit for testing the memory is packaged, e.g., within the information processing apparatus. However, a development of the processor entails saving electric power, restraining a packaging area size from increasing, improving arithmetic performance, and other equivalent elements, and it is not therefore desirable to add an unnecessary circuit to a main bus via which the data flows. Accordingly, it is not easy to properly test the memory and the processor when taking account of the power saving and the packaging area size. To be specific, as described above, it is not technically easy to enhance comprehensiveness of the load test over a long period of time or to diagnose a limit of functions of the memory and the processor in the processor having the complicated behavior. Herein, the "comprehensiveness" can be said to be, e.g., a degree of covering the test of the memory in terms of an address on the memory, the control circuit, access timing and other equivalent elements.

A testing environment independent of the processor can be prepared for a general-purpose memory instanced by SDRAM (Synchronous Dynamic Random Access Memory). It is not, however, easy to create the testing environments for memories belonging to newly proposed standards or non-general-purpose memories, resulting in an increase of cost. For instance, in recent years, there have been developed memories having new interfaces, as instanced by HMC (Hybrid Memory Cub) or HBM (High Bandwidth Memory). It is desirable from now into the future to enable an easy and efficient diagnosis of the memory in order to develop the LSI or the information processing apparatus including the memory, and other equivalent apparatuses.

An information processing apparatus according to one embodiment will hereinafter be described with reference to the drawings. A configuration of the following embodiment is an exemplification, and the present information processing apparatus is not limited to the configuration of the embodiment. The embodiment encompasses Example 1 through Example 4 that follow. Configurations encompassed by Example 1 through Example 4 may be combined with configurations of other Examples to attain modified examples of the information processing apparatus.

EXAMPLE 1

Figure 1:
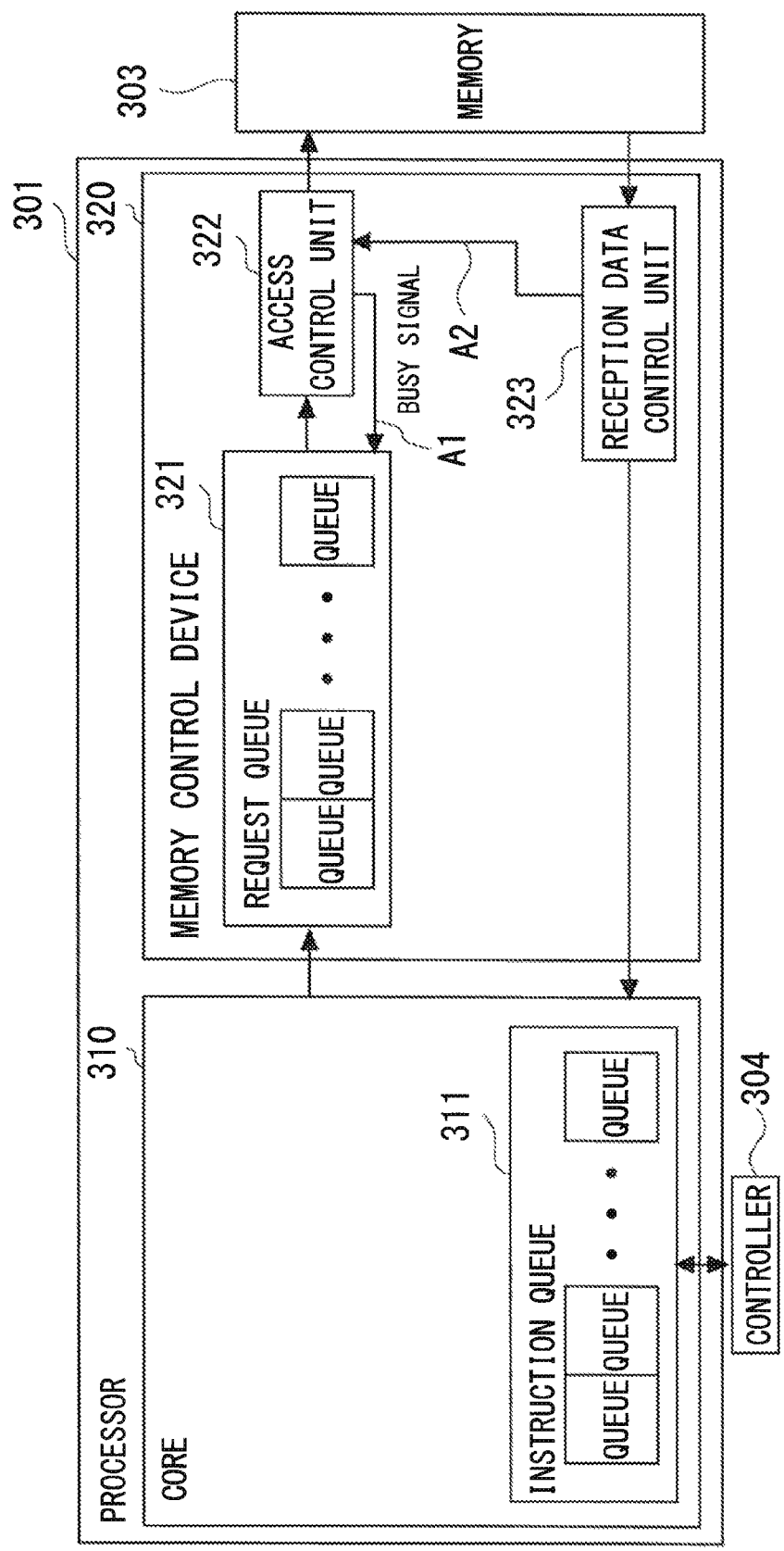
FIG. 1 is a diagram illustrating a configuration of an information processing apparatus including a memory.
Figure 2:
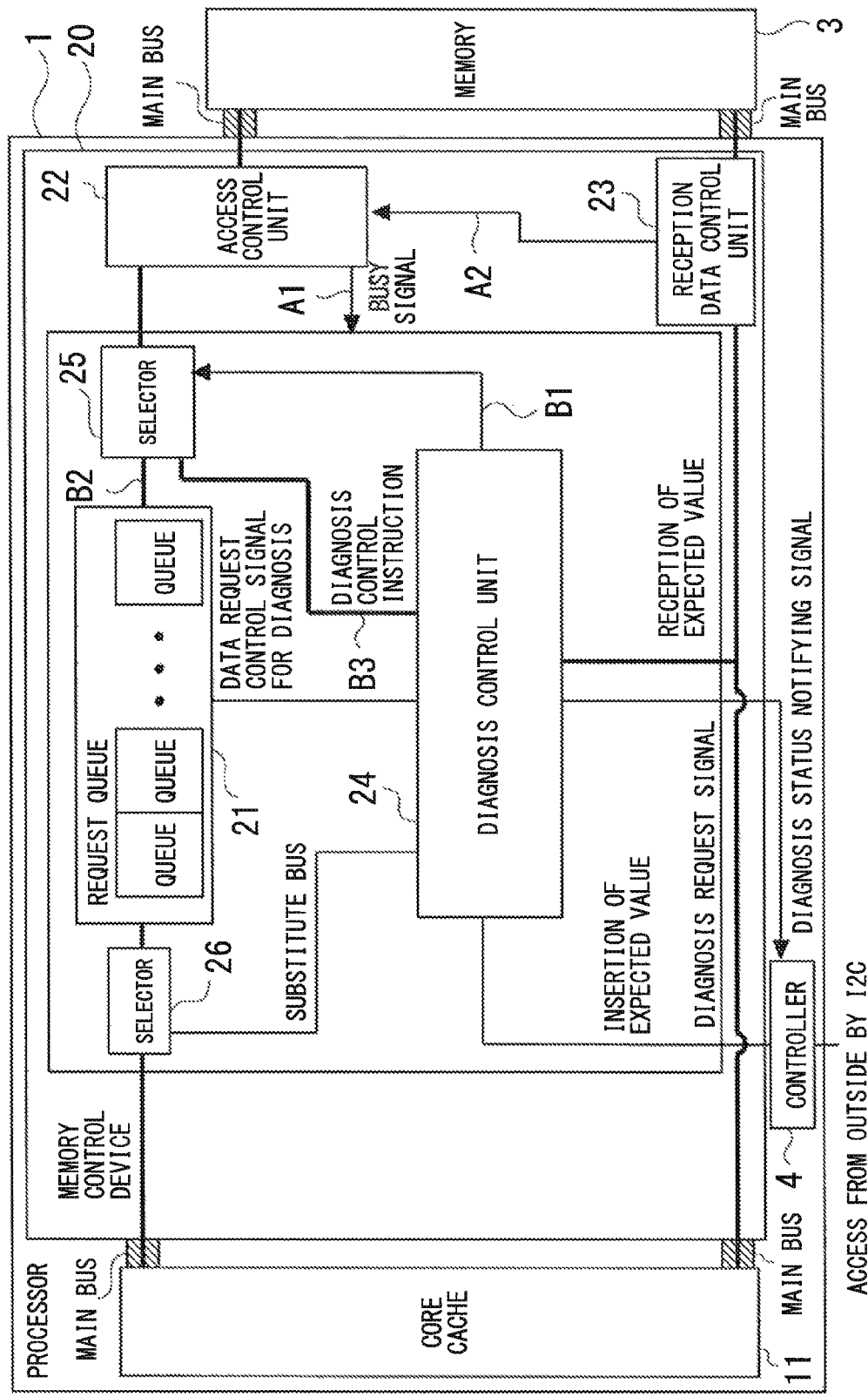
FIG. 2 is a diagram illustrating a configuration of the information processing apparatus according to Example 1.

FIG. 2 illustrates a configuration of the information processing apparatus according to Example 1. The information processing apparatus in FIG. 2 includes a processor 1, a memory 3 and a controller 4. FIG. 2 further illustrates a core cache 11 and a memory control device 20 to access the memory 3 within the processor 1. The memory control device 20 includes a request queue 21, an access control unit 22, a reception data control unit 23, a diagnosis control unit 24, and selectors 25, 26. The core cache 11, the memory control device 20 and the memory 3 are interconnected via a main bus. The main bus includes an address bus to designate an address used for the processor 1 to access the memory 3, and a data bus to transfer and receive write data and read data between the processor 1 and the memory 3. The memory control device 20 is one instance of a storage control device. The diagnosis control unit 24 is one instance of a diagnosis control device.

The processor 1 writes and reads the data to and from the memory 3 via the core cache 11. An access request from the core cache 11 to the memory 3 is transmitted via the main bus to the memory control device 20, and the memory control device 20 processes the access request accepted from the core cache 11. The access request is also simply called a request. The access request contains a processing request for writing the data to the memory 3, or a processing request for reading the data from the memory 3. In a normal operation the processor 1 sends the access request to the request queue 21 via the core cache 11, and executes the process of writing or reading the data to or from the memory 3. The processor 1 is one instance of an arithmetic processing device. The memory 3 is one instance of a storage device.

The data writing and reading processes involve registering the access request to the memory in the request queue 21 via the main bus from the core cache 11. The data write request in the access request contains write target data and a write address on the memory 3. The data read request contains a read address on the memory 3. A control circuit of the request queue 21 sends, to the sector 25, the write requests or the read requests registered in the request queue 21 according to predetermined priority levels. For instance, arbitration between plural access requests registered in entries of the request queue 21 is conducted in accordance with a predetermined procedure for gaining higher efficiency of the access to the memory 3. Then, an entry count of the request queue 21 is provided corresponding to a given request queue number (rqn) estimated to be sufficient at a design stage, depending on a condition instanced by enabling performance to be improved through the arbitration.

The selector 25 selects the access request via the request queue 21 and the access request for diagnosis form the diagnosis control unit 24, corresponding to control signals (transmission path B1) from the diagnosis control unit 24, and hands over the selected requests to the access control unit 22. The selector 25 is one instance of a first selector. The access request for diagnosis sent from the diagnosis control unit 24 will hereinafter be also called data for diagnosis.

The access control unit 22 supplies the memory 3 with an address signal on an address bus, a data signal on a data bus, a strobe signal for designating memory access timing, and other equivalent signals, thus accessing the memory 3. The reception data control unit 23 receives a response signal from the memory 3 upon the access to the memory 3 from the access control unit 22. For instance, the reception data control unit 23 acquires the data read from the memory 3 via the main bus.

(Diagnosis Control Unit 24)

In Example 1, the diagnosis control unit 24 is provided as a circuit to set the access request for diagnosis in the request queue 21 within the memory control device 20 from other than the core cache 11. To be specific, the diagnosis control unit 24 is a circuit to control the request queue 21 within the memory control device 20, and is enabled to handle the request queue 21 by operating the information processing apparatus in a debug mode. In the debug mode, the diagnosis control unit 24 controls the memory control device 20 to input the access request for diagnosis by using the request queue 21.

For instance, the diagnosis control unit 24 performs a load test and a disturb test for the memory 3. The load test is a test performed to apply a load onto the memory 3 through accessing the memory 3 a predetermined or more number of times. The disturb test is a test for checking an operation of the memory 3 not by applying the load while increasing the access count but by giving a characteristic to a way of access while differentiating the way of access from the load test. The diagnosis control unit 24 has a function to send, to the access control unit 22, a special access request for diagnosis, which is different from the request in the load test, after a loop process of setting the access request for diagnosis in the request queue 21 for the load test.

In the example of FIG. 2, the diagnosis control unit 24 connects through the selector 26 to the request queue 21 via a substitute bus equivalent to the main bus. The selector 26 selects, based on the control signals from the diagnosis control unit 24, the access request via the main bus from the core cache 11 and the access request for diagnosis via the substitute bus, and hands the selected requests to the request queue 21. Accordingly, the diagnosis control unit 24 is enabled to set, based on the control signal leading to the selector 26, the access request for diagnosis by the diagnosis control unit 24 itself in the request queue 21 by cutting off the access request via the main bus from the core cache 11. Note that the transmission path termed "substitute bus" in the example of FIG. 2 includes a control signal transmission path for controlling the selection of the selector 26, and a data transmission path for transmitting the access request to be set in the request queue 21. The selector 26 is one instance of a second selector.

The signal from the main bus and the signal from the substitute bus may be connected to the request queue 21 in place of the selector 26 by using an OR gate. For instance, the diagnosis control unit 24 may supply a busy signal as one of the control signals to the core cache 11. It may be sufficient that the core cache 11 stop, when the busy signal from the diagnosis control unit 24 is asserted, sending the access request to the request queue 21 via the main bus. It may be also sufficient that the diagnosis control unit 24 sends the access request for diagnosis to the request queue 21 via the data transmission path serving as the substitute bus and via the OR gate in a status of asserting the busy signal directed to the core cache 11.

In other words, according to Example 1, the diagnosis control unit 24 is enabled to register the access request for diagnosis in the request queue 21 in place of the core cache 11 via the substitute bus equivalent to the main bus. Accordingly, the selector 26 or the OR gate substituting for the selector 26 is an interface for connecting the main bus and the substitute bus equivalent to the main bus to the request queue 21.

The diagnosis control unit 24 connects to a control circuit of the request queue 21 through a connection line of a data request control signal for diagnosis. It may be sufficient that the connection line of the data request control signal for diagnosis is a part of the substitute bus and is also a transmission path different from the substitute bus. FIG. 2 illustrates the connection line of the data request control signal for diagnosis separately from the substitute bus.

The data request control signal for diagnosis is a signal for registering the access request for diagnosis (data for diagnosis) to the memory 3 from the diagnosis control unit 24 in place of the access request to the memory 3 from the core cache 11, the registration being made in the entry of the request queue 21 via the substitute bus. The data request control signal for diagnosis encompasses, e.g., a control signal (1) that indicates writing the access request for diagnosis, a data signal (bus) (2) that carries the access request for diagnosis, and a selection signal (3) for selecting the entry into which to write the access request for diagnosis. However, the same signal may serve as the control signal (1) and the selection signal (2) concurrently. The data signal for carrying the access request may also be a signal for accessing the request queue 21 via the selector 26 from the substitute bus.

Moreover, the diagnosis control unit 24 connects to the access control unit 22 via the selector 25. The selector 25 selects the access request for diagnosis (transmission path B2) coming from the request queue 21 and the access request for diagnosis (transmission path B3) coming from the diagnosis control unit 24, based on the control signal (transmission path B1) from the diagnosis control unit 24, and hands over these selected requests to the access control unit 22. The diagnosis control unit 24 therefore can cut off the access request from the request queue 21 according to the control signal leading to the selector 25, and can output the access request given from the diagnosis control unit 24 itself to the access control unit 22. The access request given from the diagnosis control unit 24 itself in place of the access request from the request queue 21 is used for, e.g., the disturb test.

The diagnosis control unit 24 includes a control unit to execute a predetermined control process, and a plurality of registers to retain the data when processed by the control unit. The diagnosis control unit 24 further includes a mode register to set the information processing apparatus in the debug mode. When the mode register is set in the debug mode, the diagnosis control unit 24 performs the test for the memory 3. In the test for the memory 3, as described above, the diagnosis control unit 24 cuts off the access request via the main bus from the core cache 11 according to the control signal of, e.g., the selector 26, and sets the access request for diagnosis given from the diagnosis control unit 24 itself in the request queue 21. Further, e.g., the diagnosis control unit 24 cuts off the access request from the request queue 21 according to the control signal leading to the selector 25 at predetermined timing, and outputs the access request for diagnosis given from the diagnosis control unit 24 itself to the access control unit 22.

Figure 3:
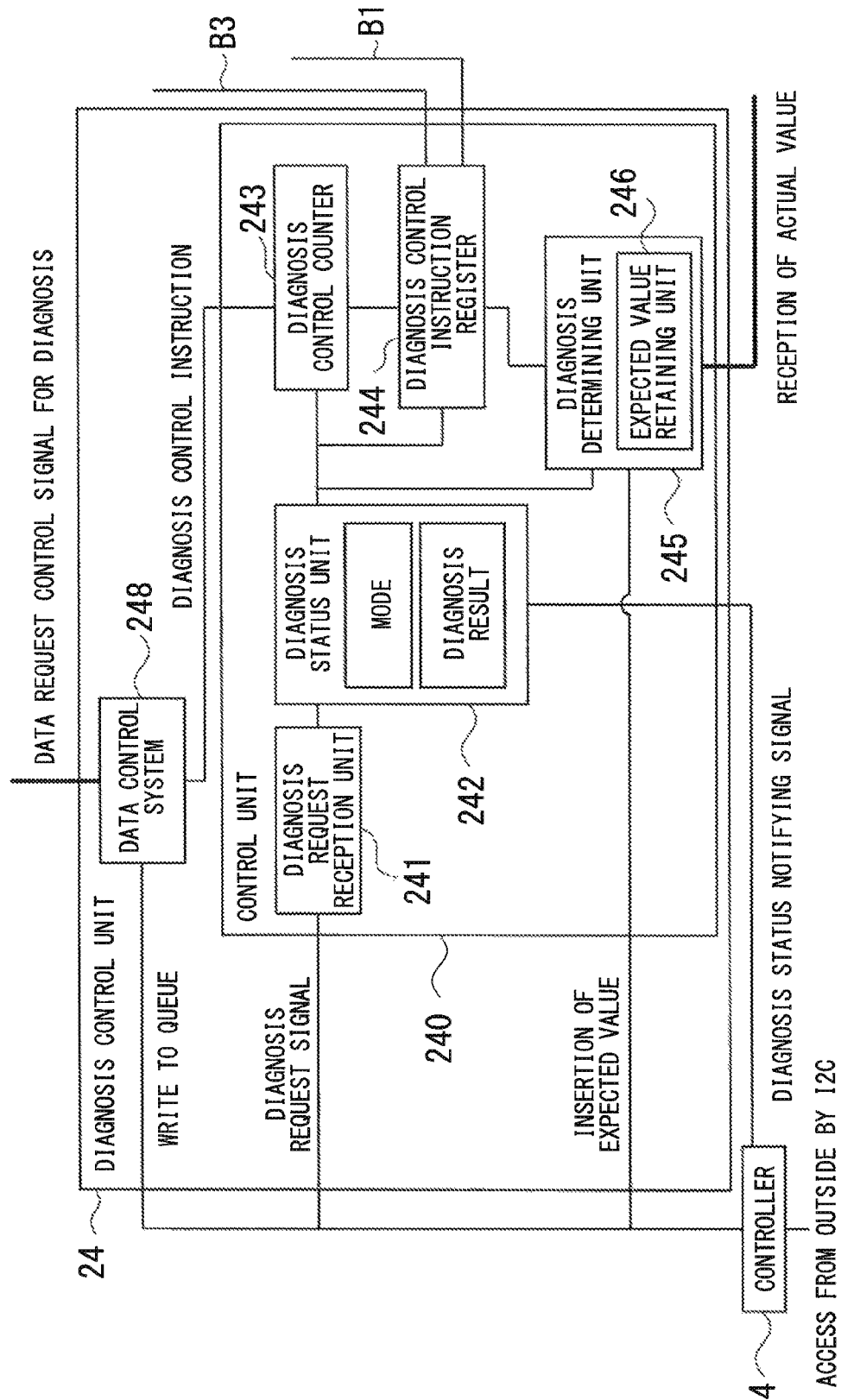
FIG. 3 is a diagram illustrating a detailed configuration of a diagnosis control unit.

FIG. 3 illustrates a detailed configuration of the diagnosis control unit 24. As depicted in FIG. 3, the diagnosis control unit 24 includes a control unit 240 and a data control system 248. The control unit 240 includes a diagnosis request reception unit 241, a diagnosis status unit 242, a diagnosis control counter 243, a diagnosis control instruction register 244, a diagnosis determining unit 245 and an expected value retaining unit 246.

The control unit 240 executes processes corresponding to commands set in the diagnosis request reception unit 241. The processes corresponding to the commands of the control unit 240 may also be executed by hardware circuits instanced by a combinational logic circuit, a sequence logic circuit, a sequence control circuit and other equivalent circuits within the diagnosis control unit 24. The processes corresponding to the commands of the control unit 240 may also be executed by a processor provided in the control unit 240 and by an instruction string of firmware for supplying instructions to the processor.

The diagnosis request reception unit 241 accepts and retains a bit pattern of the command given to the control unit 240 from the controller 4, resulting in causing the control unit 240 to start up predetermined processes. The diagnosis status unit 242 includes a plurality of registers, e.g., a mode register (corresponding to a block labelled "mode" in FIG. 3) and a diagnosis result register (corresponding to a block labelled "diagnosis result" in FIG. 3). The diagnosis request reception unit 241 sets the mode register in the debug mode upon accepting a test execution command.

When the mode register in the diagnosis status unit 242 is set in the debug mode, the diagnosis control unit 24 operates in the debug mode. In the debug mode, the control unit 240 executes, e.g., starting the load test, starting the disturb test and checking the test results as the processes corresponding to the commands set in the diagnosis request reception unit 241. The control unit 240 transmits, to the request queue 21, the access request for the load test via the substitute bus and the selector 26 (FIG. 2) through the data control system 248, and executes the load test. Further, the control unit 240 transmits the access request for the disturb test after the load test via the selector 25 (FIG. 2), thereby executing the disturb test. The data control system 248 is one instance of a second request retaining unit.

The control unit 240 compares an expected value transmitted by the diagnosis determining unit 245 from the controller 4 and retained by the expected value retaining unit 246 with reception data as a response from the memory 3. The control unit 240 executes control of registering a compared result in the diagnosis result register of the diagnosis status unit 242, and sending contents of the diagnosis result register back to the controller 4 after finishing the load test and the disturb test.

It may be sufficient that the diagnosis status unit 242 associates the diagnosis results with addresses on the accessed memory 3, and register the diagnosis results of the associated addresses in a plurality of entries of the diagnosis result register. Accordingly, it may be sufficient that the controller 4 reads the diagnosis results from the diagnosis status unit 242, the diagnosis results being associated with the addressed on the memory 3. However, the control unit 240 may aggregate the diagnosis results of the plurality of addresses by, e.g., an OR operation and other equivalent operations.

The diagnosis control counter 243 counts a number of access requests to be set in the request queue 21 from the data control system 248. For instance, the diagnosis control counter 243 counts the access requests till reaching a predetermined value, the access requests being sent to the access control unit 22 (FIG. 2) from the request queue 21 in the load test. When the number of access requests counted by the diagnosis control counter 243 reaches the predetermined value, the control unit 240 sets a diagnosis control instruction for performing the disturb test in the diagnosis control instruction register 244. However, the control unit 240 may cause the diagnosis control counter 243 to count the access requests in loop a plural number of times within a range from a minimum count value (0) up to a maximum count value, and may send the access requests to the request queue 21 the plural number of times repeatedly.

The diagnosis control instruction register 244 retains the control signal (the data sent to the transmission path B1 in FIG. 3) to switch over the selector 25 to the access request given from the diagnosis control unit 24 for executing the disturb test, and also retains the access request (the data sent to the transmission path B3 in FIG. 3) that this sent to the access control unit 22 via the selector 25 in the disturb test. In Example 1, the signal retained by the diagnosis control instruction register 244 and sent to the transmission paths B1, B3 is called a diagnosis control instruction. The entries of the diagnosis control instruction register 244, which transmits the control signal via the transmission path B1, are one instance of a first selection control unit. The entries of the diagnosis control instruction register 244, which transmits the data becoming the access request via the transmission path B3, are one instance of a first request retaining unit.

The diagnosis determining unit 245 acquires the reception data as a response from the memory 3 via the reception data control unit 23 (FIG. 2). Subsequently, the diagnosis determining unit 245 compares the reception data from the memory 3 with the expected value retained by the expected value retaining unit 246, and registers a compared result in the test result register of the diagnosis status unit 242. The expected value retaining unit 246 retains the expected value sent from the controller 4.

The data control system 248 retains, as an initial value, the access request for diagnosis (the data for diagnosis) sent from the controller 4 to the request queue 21, and sets the access request for diagnosis in the request queue 21 corresponding to the count value of the diagnosis control counter 243. The control circuit of the request queue 21 selects the entry of the request queue 21 according to the predetermined priority level, and sends the access request for diagnosis registered in the selected entry to the access control unit 22 (FIG. 2).

The controller 4 causes the diagnosis control unit 24 to operate the information processing apparatus in the debug mode. The controller 4 is connected to the respective units of the diagnosis control unit 24 via a transmission path based on communication standards instanced by JTAG (Joint Test Action Group) or I2C (Inter-Integrated Circuit) and other equivalent standards. For instance, the diagnosis control unit 24, when being a device (circuit block) supporting JTAG, includes a control register corresponding to a predetermined function, a TAP (Test Access Port) controller, a data register for setting the value in a signal line leading to the request queue 21, and other equivalent components therein. When JTAG is adopted as an interface with the diagnosis control unit 24, e.g., the TAP controller is one instance of the control unit 240 in FIG. 3.

When the controller 4 and the diagnosis control unit 24 are interconnected based on JTAG, it may be sufficient that the controller 4 sets the values in the control registers and the data registers of the respective units of the diagnosis control unit 24 by a JTAG boundary scan, and causes the control unit 240 (e.g., the TAP controller) within the diagnosis control unit 24 to execute processes corresponding to the control registers. Note that a procedure of setting the values in the respective units within the diagnosis control unit 24 is the same as in the instance of JTAG also when the controller 4 and the diagnosis control unit 24 are interconnected based on I2C. It does not therefore mean in Example 1 and following other Examples that there is particularly a limit to which communication standards the controller 4, the diagnosis control unit 24 and other equivalent components are interconnected based on.

In any case, the controller 4 sets the values in the data register connected to the substitute bus and the data register and other equivalent registers connected to the connection line of the data request control signal for diagnosis by the JTAG boundary scan, the I2C serial communication and other equivalent circuit testing methods. The controller 4 further sets the expected value of the test result in the expected value retaining unit 246 of the diagnosis control unit 24. When performing the test, the controller 4 sets a diagnosis request signal (e.g., a private instruction unique to a vendor of the information processing apparatus) in the diagnosis request reception unit 241 of the diagnosis control unit 24. Note that the controller 4 sets the expected value of the test result in the expected value retaining unit 246 by the JTAG boundary scan, the I2C and other equivalent circuit testing methods.

The diagnosis control unit 24, upon accepting the diagnosis request signal, generates the access request to the memory 3, and sends the generated access request to the request queue 21 via the substitute bus from the data control system 248. At this time, it may be sufficient that the request queue 21 accepts the access request of the diagnosis control unit 24 via the substitute bus in the same procedure as when accepting the access via the main bus from the core cache 11, and registers the access request in the entry of the queue.

The diagnosis control unit 24 causes the diagnosis control counter 243 or another equivalent counter to count a loop count of how many times the processing is iterated in loop, and generates the access request to be inputted to the request queue 21 when conducting the load test for the memory 3. The diagnosis control unit 24, in addition to the generation of the access request for the load test, further generates such a number of access requests for the disturb test as to correspond to the number of times the disturb test is performed.

The access request for the load test to the memory 3 from the diagnosis control unit 24, which is registered in the request queue 21, is transferred to the memory 3 via the selector 25 and the access control unit 22. Further, the access request for the disturb test, which is sent by the diagnosis control unit 24, is transferred to the memory 3 via the transmission path B3, the selector 25 and the access control unit 22.

The memory 3 returns the response signal in response to the access requests for the load test and the disturb test to the reception data control unit 23. The reception data control unit 23 sends the reception data based on the response signal to the access control unit 22 and the diagnosis control unit 24.

(Processing Example)

In the configurations of FIGS. 2 and 3, the control unit 240 executes the following processes by setting a diagnosis request signal.

A. Testing Process (Process 1) The control unit 240 sets the control signal (the data request control signal for diagnosis in FIG. 3) in the selector 26 via the data control system 248 so that the selector 26 selects the data signal via the substitute bus from the diagnosis control unit 24.

(Process 2) The control unit 240 sets the control signal in the selector 25 so that the selector 25 selects the access request from the request queue 21.

(Process 3) The control unit 240 sends the access request for accessing the memory 3 to the request queue 21 via the substitute bus.

(Process 4) The control unit 240 executes the process 3 a specified number of times based on specifications of the load test.

(Process 5) The control unit 240 sets the control signal (the transmission path B1 in FIG. 3) retained by the diagnosis control instruction register 244 in the selector 25 so that the selector 25 selects the access request from the diagnosis control unit 24 after finishing the load test.

(Process 6) The control unit 240 hands over the access request (the transmission path B3 in FIG. 3) specified in the specifications of the disturb test, which is retained by the diagnosis control instruction register 244 to the access control unit 22 through the selector 25.

(Process 7) The control unit 240 executes the process 6 a specified number of times based on specifications of the disturb test.

(Process 8) The reception data control unit 23 acquires an actual value (e.g., data read from the memory 3) of the response signal obtained via the main bus and given from the memory 3.

(Process 9) The control unit 240 compares the expected value set in the expected value retaining unit 246 with the actual value acquired in the process 8, and saves a compared result in the diagnosis result register of the diagnosis status unit 242.

(Process 10) The control unit 240 outputs, to the controller 4, the compared result retained in the diagnosis result register of the diagnosis status unit 242 by, e.g., the JTAG boundary scan.

B. Resetting Process

The control unit 240, upon completing the process corresponding to a test execution command, sets the control signal leading to the selector 26 so that the selector 26 selects the signal coming from the main bus. The control unit 240 further sets the control signal leading to the selector 25 so that the selector 25 selects the access request from the request queue 21.

In the information processing apparatus according to the configuration described above, the diagnosis control unit 24 performs setting in the entries of the request queue 21 via the substitute bus and the transmission path for the data request control signal for diagnosis in place of the main bus for accessing the memory 3 from the core cache 11. As a result, the diagnosis control unit 24 is enabled to input the access request to the memory 3 to the request queue 21. The diagnosis control unit 24 can send, to the request queue 21, the access request to the memory 3 from the substitute bus equivalent to the main bus without depending on intricacies of the instruction of the processor 1, the configuration of the cache of the processor 1, and other equivalent elements.

The diagnosis control counter 243 to count a loop processing count is provided in the diagnosis control unit 24, whereby the diagnosis control unit 24 can repeatedly generate the access requests a number of times that the load test is carried out. Further, in addition to the access requests for the load test, the diagnosis control unit 24 can generates the access requests for the disturb test a number of times that the disturb test is carried out, and can send the access requests to the access control unit 22 through the selector 25, thereby enabling the disturb test to be performed.

It may be sufficient for executing a testing procedure that the diagnosis control unit 24 incorporates a control sequence, a control circuit and other equivalent components for performing a desirable test, corresponding to the diagnosis request signal from the controller 4 in the information processing apparatus. The diagnosis control unit 24 in Example 1 can easily separate the access coming from the core cache 11 from the access coming from the diagnosis control unit 24, based on the control signals given from the diagnosis control unit 24, by using the selector 26 or a logical gate instanced by an OR circuit and other equivalent circuits in place of the selector 26. Further, the diagnosis control unit 24 in Example 1 can easily cut off the access from the core cache 11 by use of the selector 26.

The diagnosis control unit 24 in Example 1 can do switchover between the access request from the request queue 21 and the access request from the diagnosis control unit 24 by using the selector 25. Accordingly, e.g., the diagnosis control unit 24 can perform the load test via the request queue 21 on one hand, and can also perform the disturb test inclusive of a special access from the diagnosis control unit 24 on the other hand. As a result, a variety of test patterns can be generated and applied to the memory 3, thereby enhancing a possibility that comprehensiveness of the test can be improved.

As discussed above, the information processing apparatus in Example 1 can authenticate a testing object by efficiently performing the memory diagnosis similar to the load test and the disturb test without depending on an intricacy of architecture of the processor 1 or the interface of the memory 3. The information processing apparatus in Example 1 packages a circuit not requiring an excessive area size when packaged by adopting the diagnosis control unit 24 as in FIG. 3. The diagnosis control unit 24 accesses the request queue 21 via the substitute bus substituting for the main bus by the selector 26 or the interface instanced by the OR circuit and other equivalent circuits in place of the selector 26. Accordingly, the diagnosis control unit 24 is restrained from affecting the transmission path for accessing the request queue 21 from the core cache 11 in a normal status with any test not being conducted.

EXAMPLE 2

Figure 4:
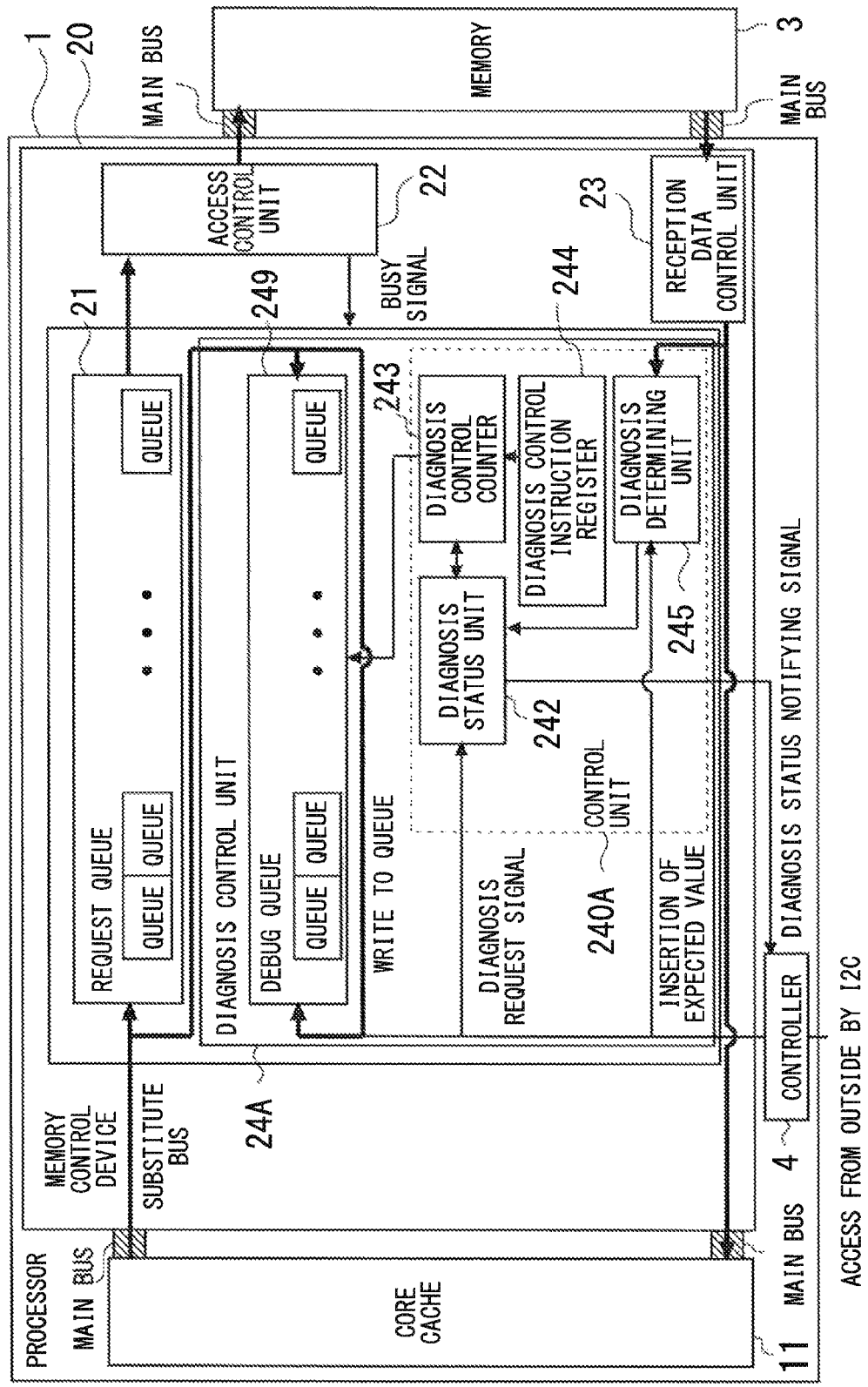
FIG. 4 is a diagram illustrating a configuration of the information processing apparatus according to Example 2.

FIG. 4 illustrates a configuration of the information processing apparatus according to Example 2. The information processing apparatus in FIG. 4 includes, similar to Example 1, the processor 1, the memory 3 and the controller 4. FIG. 4 depicts the core cache 11 and the memory control device 20 that accesses the memory 3 within the processor 1. The memory control device 20 includes the request queue 21, the access control unit 22, the reception data control unit 23 and a diagnosis control unit 24A. The diagnosis control unit 24A includes a control unit 240A and a debug queue 249.

In the information processing apparatus according to Example 2, the control unit 240A has the same configuration as the configuration in FIG. 3 in Example 1. According to Example 2, however, the control unit 240A includes the diagnosis status unit 242, the diagnosis control counter 243, the diagnosis control instruction register 244 and the diagnosis determining unit 245, while the diagnosis request reception unit 241 is omitted in FIG. 4. The components between the core cache 11 and the memory 3 in FIG. 4 are the same as those in FIG. 2, and the explanations thereof are omitted.

Example 1 described above has discussed the information processing apparatus configured so that the diagnosis control unit 24 in place of the core cache 11 registers the access request in the request queue 21 from the substitute bus, and performs the load test. Example 1 has discussed also the information processing apparatus configured so that the diagnosis control unit 24 sends the access request for the disturb test to the access control unit 22 via the selector 25. On the other hand, according to Example 2, the diagnosis control unit 24A includes the debug queue 249 for generating the access request for the load test and the access request for the disturb test. Therefore, the information processing apparatus in Example 2 may omit the selector 25 used in Example 1. Other components in Example 2 are the same as those in Example 1. This being the case, the same components in Example 2 as those of Example 1 are marked with the same numerals and symbols as those in Example 1, and their explanations are omitted.

As discussed above, in the information processing apparatus of Example 2, the diagnosis control unit 24A includes the debug queue 249. The debug queue 249 retains the access request for the load test and the access request for the disturb test, the access requests being sent to the memory 3 via the request queue 21. The debug queue 249 is one instance of a first request retaining unit.

It may be sufficient that an entry count "dqn" of the debug queue 249 is larger than the request count for performing the load test. When the debug queue 249 supports the load test and the disturb test, it may be sufficient that entries corresponding to the number of queues for retaining the requests for the disturb test are added to the entry count dqn of the debug queue 249 in addition to the number of requests for performing the load test. Such being the case, in the information processing apparatus of Example 2, the debug queue 249 is provided to satisfy, e.g., a relationship "dqn>cn+scn", where "dqn" represents the entry count of the debug queue 249, "cn" denotes an access request count for performing the load test, and "scn" designates an access request count for the disturb test. In the information processing apparatus of Example 2, the controller 4 sets the access request for diagnosis (the data for diagnosis) in the debug queue 249 of the diagnosis control unit 24A, and transmits the diagnosis request signal to the control unit 240A. Then, the control unit 240A writes the data of the debug queue 249 to the request queue 21 via the substitute bus, thereby subsequently accessing the memory and carrying out the diagnosis.

Note that an addition of a complicated instruction instanced by atomic computing leads to an intricacy of an arbitrary method of the request queue 21, resulting in a larger number of stages of the request queue 21 than a value given by (cn+scn) as the case may be. Herein, the atomic computing may be exemplified by executing a series of operations by one instruction as instanced by Compare-and-Swap (CAS) with respect to the memory 3.

A connection between the debug queue 249 and the request queue 21 is, similarly to the information processing apparatus of Example 1, established by the substitute bus substituting for the main bus. Further similarly to the information processing apparatus of Example 1, it may be sufficient that the main bus and the substitute bus are connected to the request queue 21 by switching over an interface instanced by the selector controlled by the control signal given from the control unit 240A of the diagnosis control unit 24A. The main bus and the substitute bus may also connected to the request queue 21 through an OR connection. For instance, it may be sufficient that the control unit 240A of the diagnosis control unit 24A cuts off the access to the request queue 21 via the main bus from the core cache 11 by transmitting a busy signal to the core cache 11 and the main bus. It may be also sufficient that, e.g., after the controller 4 has set the diagnosis request signal, the diagnosis control unit 24A is set in the debug mode and transmits the access request registered in the debug queue 249 to the request queue 21 in the same way as in Example 1.

The diagnosis status unit 242 includes the mode register and the diagnosis result register similarly to Example 1. The diagnosis control unit 24A transmits, based on the mode register, the control signal for controlling the interface instanced by the foregoing selector or the OR connection and other equivalent interfaces. In other words, it may be sufficient that the diagnosis control unit 24A controls, based on the mode register, to send the access request from the debug queue 249 to request queue 21 by cutting off the access to the request queue 21 via the main bus from the core cache 11.

The controller 4 is, similarly to Example 1, connected to the respective units, i.e., the debug queue 249, the diagnosis status unit 242, the diagnosis determining unit 245 and other equivalent units of the diagnosis control unit 24A via the transmission path based on the communication standards instanced by JTAG (Joint Test Action Group) or I2C and other equivalent standards. For instance, the controller 4 sets the access request for testing the memory 3 in the debug queue 249. The controller 4 sets the expected value of the test result in the diagnosis determining unit 245, further sets the diagnosis request signal, e.g., a private instruction unique to a vendor of the information processing apparatus in the control register (which corresponds to the diagnosis request reception unit 241 or another equivalent unit omitted in FIG. 4 but illustrated in FIG. 3 of Example 1), and thus starts the test.

The diagnosis control counter 243 counts a number of queues of the access requests to be sent to the request queue 21 from the debug queue 249. The control circuit of the debug queue 249 writes the access requests for testing the memory 3 to the request queue 21 according to the predetermined priority levels from the debug queue 249, based on a count value of the diagnosis control counter 243. At this time, it may be sufficient that the request queue 21 accepts the access requests retained in the debug queue 249 via the substitute bus in the same procedure as when accepting the accesses via the main bus from the core cache 11, and registers the accepted requests in the entries within the request queue 21. It may be therefore sufficient that the diagnosis control counter 243 counts the count value within a range from a minimum value (0) to a maximum value. When the count value exceeds the maximum value, the diagnosis control counter 243 continues to count in loop with the count value being reset to "0". The control circuit of the debug queue 249 writes the access requests to the request queue 21 by looping the entries of the debug queue 249 in accordance with the count value of the diagnosis control counter 243, and is thereby enabled to issue a larger number of access requests than the length "dqn" of the debug queue 249.

The diagnosis determining unit 245 (specifically, the expected value retaining unit 246 omitted in FIG. 4 but illustrated in FIG. 3 of Example 1) receives setting of the expected value from the controller 4 in the same way as in Example 1. The diagnosis determining unit 245 compares the reception data as a response sent from the reception data control unit 23 with the expected value, and stores a diagnosis result in the diagnosis status unit 242.

Thus, the diagnosis control unit 24A can implement even the test containing the instruction entailing the complicated operation for the memory by preparing the debug queue 249 for the request queue 21. In Example 2 also, similarly to Example 1, the diagnosis control unit 24A performs setting in the entries of the request queue 21 in place of the main bus for accessing the memory 3 from the core cache 11. As a result, the diagnosis control unit 24A can input the access request to the memory 3 into the request queue 21. The diagnosis control unit 24A can send the access request to the memory 3 to the request queue 21 from the substitute bus equivalent to the main bus without depending on the intricacies of the instruction of the processor 1, the configuration of the cache of the processor 1, and other equivalent elements.

A function of looping the debug queue 249 enables issuance of a larger number of access requests to the memory 3 than the entry count of the debug queue 249, and also enables the load test to be performed. Further, the diagnosis control unit 24A can perform the disturb test together with the load test by embedding a special access for the disturb test in the debug queue 249 in addition to the entries of the debug queue 249 for the load test.

Note that the packaging of the circuit for executing the instruction string long and complicatedly results in ensuring a corresponding entry count "dqn" of the debug queue. Accordingly, the information processing apparatus according to Example 2 has a problem of increasing a packaging area size along with the entry count "dqn" of the debug queue.

EXAMPLE 3

Figure 5:
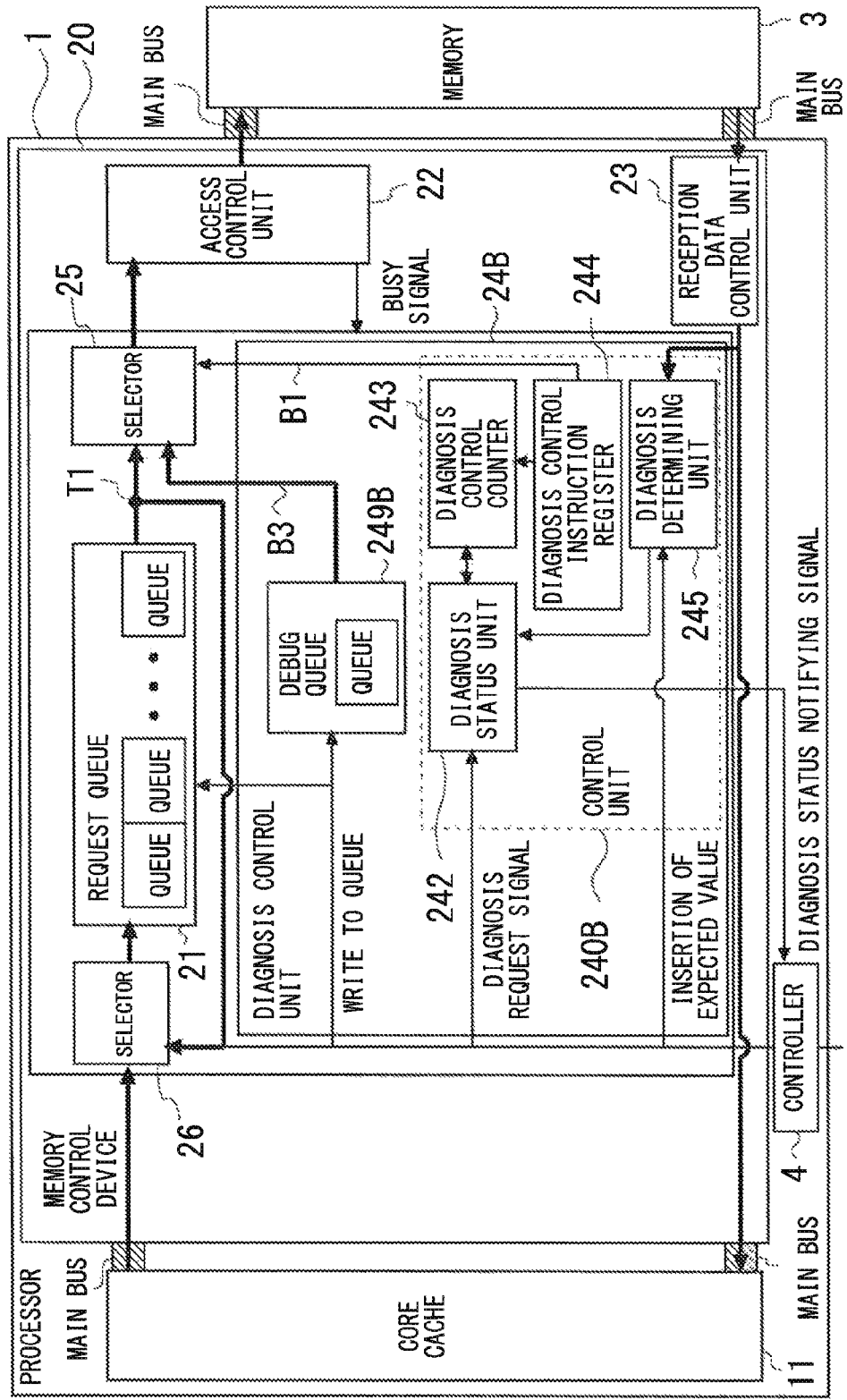
FIG. 5 is a diagram illustrating a configuration of the information processing apparatus according to Example 3.

FIG. 5 illustrates the information processing apparatus according to Example 3. The information processing apparatus in FIG. 5 includes, similarly to Example 1 and Example 2, the processor 1, the memory 3 and the controller 4. Similarly to Example 1 and Example 2, the memory control device 20 provided in the processor 1 includes the request queue 21, the access control unit 22, the reception data control unit 23 and a diagnosis control unit 24B. Furthermore, the diagnosis control unit 24B is configured to include, similarly to diagnosis control unit 24A in Example 2, a debug queue 249B, the diagnosis status unit 242, the diagnosis control counter 243, the diagnosis control instruction register 244 and the diagnosis determining unit 245.

By the way, Example 2 provides the entry count "dqn" of the debug queue 249B, which follows. To be specific, the debug queue 249 is provided to satisfy, e.g., the relationship "dqn>cn+scn", where "cn" denotes the access request count for performing the load test, and "scn" designates the access request count for the disturb test. On the other hand, in Example 3, the entry count "dqn" of the debug queue 249B is provided substantially equal to or smaller than the access request count "snc" for the disturb test. Therefore, in Example 3, a physical configuration disables the debug queue 249B from retaining a sufficient number of access requests for the load test. The debug queue 249B in Example 3 is one instance of a first request retaining unit.

On the other hand, in Example 3, an output signal from the request queue 21 branches off the signal line leading to the access control unit 22 on a branch path T1 and is returned to the interface on the input side of the request queue 21. Herein, the interface on the input side of the request queue 21 is exemplified by the selector 26 in FIG. 3 of Example 1 or the OR circuit and other equivalent circuits in place of the selector 26. The interface on the input side of the request queue 21 selects the access request given from the core cache 11 via the main bus and the access request given from the branch path T1 branching off the output signal of the request queue 21, based on a loop control signal from the diagnosis status unit 242 of the diagnosis control unit 24B. In a configuration of FIG. 5, the request queue 21 itself is one instance of a second request retaining unit. Further, the branch path T1 is one instance of a branch path.

In Example 3, the diagnosis status unit 242 includes, similarly to Example 2 and Example 3, the mode register and the diagnosis result register. The mode register retains a signal value of a loop control signal to be transmitted to the interface on the input side of the selector or another equivalent component. Specifically, the mode register of the diagnosis status unit 242 controls the interface (the selector 26 or another equivalent component in FIG. 2) on the input side of the request queue 21 to select the signal branching off the output signal of the request queue 21 in place of the main bus. A value of the mode register at this time can be said to be a value indicating the debug mode. Note that the diagnosis result register of the diagnosis status unit 242 registers, similarly to Example 2 and Example 3, test result data deemed as a result of comparing the response signal given from the memory 3 with the expected value.

As described above, in the debug mode, the output signal from the request queue 21 branches off the signal line leading to the selector 25 and returns to the selector 26 on the input side of the request queue 21. Further, the mode register of the diagnosis status unit 242 receives setting of a control signal for selecting the signal branched off an output side of the request queue 21 by the selector 26 via the branch path T1. Consequently, the access request to the memory 3, which is sent from the request queue 21, is registered again in the request queue 21via the branch path T1 and the selector 26. Accordingly, even when the entry count of the request queue 21 is smaller than the access request count "cn" for performing the load test, the memory control device 20 in FIG. 5 can effectively send, to the memory 3, the access requests exceeding the access request count "cn" for performing the load test.

On the other hand, the selector 25 on the output side of the request queue 21 selects the access request from the request queue 21 and the access request from the debug queue 249B in accordance with the control signal given from the diagnosis control instruction register 244, and hands over the selected requests to the access control unit 22. The diagnosis control instruction register 244, when the count value of the diagnosis control counter 243 exceeds the loop count in the load test, outputs the selection signal so that the selector 25 selects the access request from the debug queue 249B. Other components of Example 3 are the same as those in Example 2, and explanations thereof are omitted.

As in FIG. 5, the controller 4 sets the access request (the data for diagnosis) for the load test in the request queue 21. The controller 4 further sets the access request (the data for diagnosis) for the disturb test in the debug queue 249B. The controller 4, the request queue 21 and the units of the diagnosis control unit 24B are interconnected through serial communications based on JTAG or I2C and other equivalent standards. It may be sufficient that the controller sets the data for diagnosis, the expected value and other equivalent information in the request queue 21, the debug queue 249B, the diagnosis status unit 242 and the diagnosis determining unit 245 (specifically the expected value retaining unit 246 in FIG. 3) through the serial communications based on JTAG or I2C and other equivalent standards.

The diagnosis control counter 243 executes a counter operation to increment the value along with transmitting the access requests to the selector 25 from the request queue 21. Subsequently, when the diagnosis control counter 243 counts up to a value over the access request count "cn" for performing the load test, the diagnosis control instruction register 244 transmits the control signal (the transmission path B1) to the selector 25. The selector 25 selects and acquires the access request (the transmission path B3) registered in the debug queue 249B according to the control signal (the transmission path B1) from the diagnosis control instruction register 244, and hands over the acquired access request to the access control unit 22. The debug queue 249B already registers the access request for the disturb test. Accordingly, when the diagnosis control counter 243 counts up to the value over the access request count "cn" for performing the load test, the information processing apparatus executes the disturb test.

As described above, in Example 3, the memory control device 20 registers again and again the access requests sent to the memory 3 in the request queue 21 from the request queue 21 via the branch path T1. As a result, the memory control device 20 can send the access requests over the access request count "cn" for performing the load test to the memory 3. When the diagnosis control counter 243 counts up to the value over the access request count "cn" for performing the load test, the selector 25 selects and acquires the access requests registered in the debug queue 249B, and hands over the acquired requests to the access control unit 22, thereby executing the disturb test. The information processing apparatus in Example 3 therefore does not have to retain the access requests for performing the load test in the debug queue 249B by registering again the access requests in the request queue 21 through the loop process. As a result, the entries of the debug queue 249B are reduced. In other words, the information processing apparatus in Example 3 can package the diagnosis control unit 24B that performs the load test and the disturb test with a small packaging area size.

In Example 3 also, the initial setting of the diagnosis control unit 24B and the registration of the access requests for the load test into the request queue 21 are carried out independently of the access requests from the request queue 21 and the main bus. Accordingly, the information processing apparatus can package the circuits to perform the disturb test, the load test and other equivalent tests while reducing a degree of how much the operation of the processor or the cache is affected even when the behavior of the processor or the cache is complicated by, e.g., mounting a plurality of cores, diversifying the cache, diversifying the function of the interconnect between the plural processors, and other equivalent schemes.

EXAMPLE 4

Figure 6:
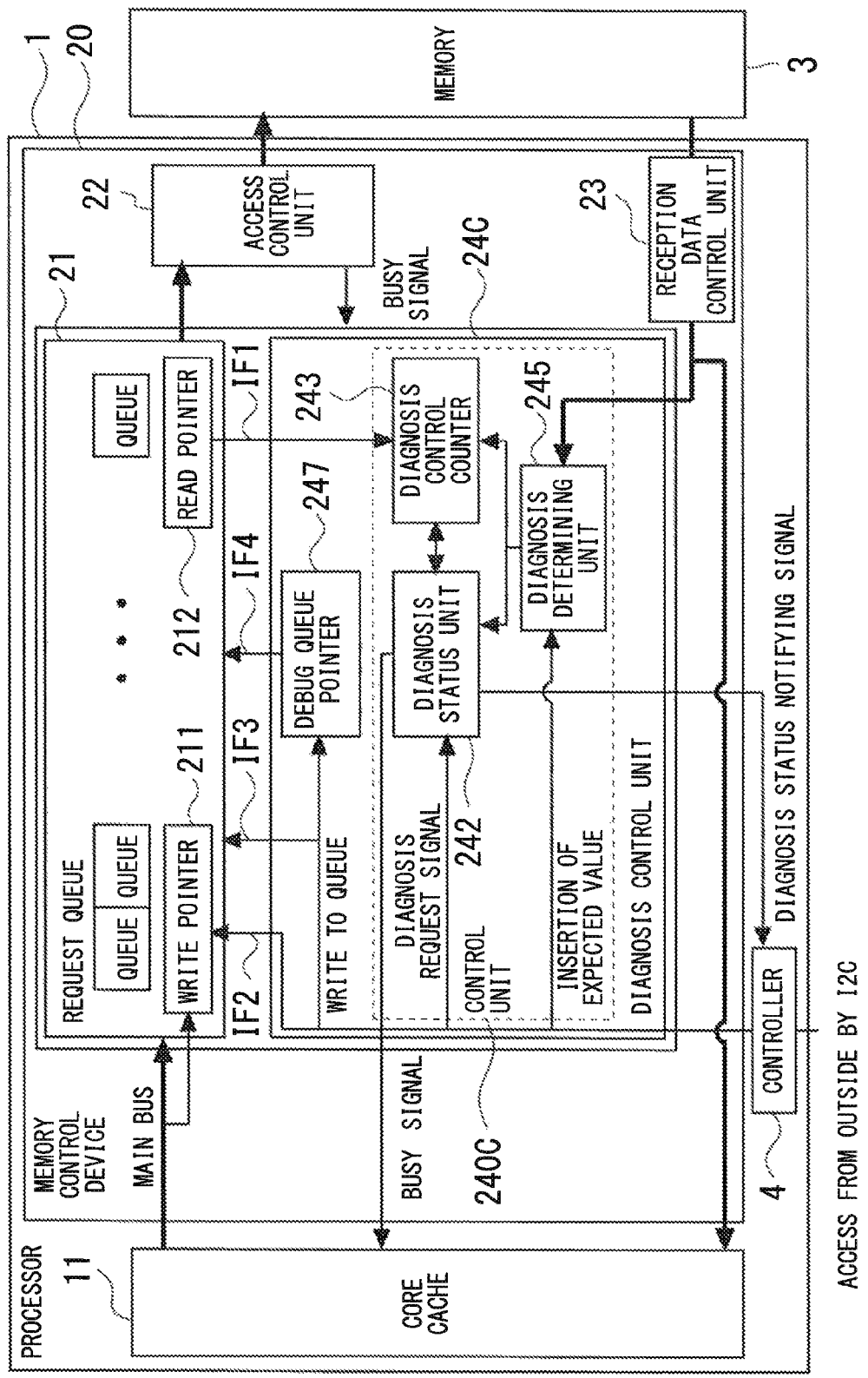
FIG. 6 is a diagram illustrating a configuration of the information processing apparatus according to Example 4.

FIGS. 6 through 9 illustrate the information processing apparatus according to Example 4. The information processing apparatus in FIG. 6 includes, similarly to Example 1 through Example 3, the processor 1, the memory 3 and the controller 4. In FIG. 6, a diagnosis control unit 24C of the memory control device 20 provided in the processor 1 includes a debug queue pointer 247 and a control unit 240C. A configuration of the control unit 240C is the same as the configurations of the control unit 240 in Example 1, the control unit 240A in Example 2 and the control unit 240B in Example 3, and includes the diagnosis status unit 242, the diagnosis control counter 243 and the diagnosis determining unit 245. In Example 4, a write pointer 211 designates a write location in the request queue 21, while a read pointer 212 designates a read location in the request queue 21.

The diagnosis control unit 24C sets a value in the read pointer 212, based on the count value of the diagnosis control counter 243. The diagnosis control unit 24C therefore includes an interface IF1 (see FIG. 7) accessible to the read pointer 212. The interface IF1 is one instance of an interface to update a read pointer. The diagnosis control unit 24C includes a control interface IF4 (see FIG. 7) to send the access request registered in the relevant entry of the request queue 21 to the access control unit 22, based on a count value of the debug queue pointer 247.

Example 4 is not provided with the selectors, 25, 26 of Example 1. Other components in Example 4 are the same as those in Example 1 through Example 3. This being the case, the same components as those in Example 1 through Example 3 are marked with the same numerals and symbols, and their explanations are omitted.

It is now assumed that the arbitrary method within the request queue 21 is FIFO (First In First Out). Accordingly, Example 4 entails sequentially writing the access requests in the request queue 21 on the basis of the write pointer 211, and sequentially reading the access requests on the basis of the read pointer 212. The core cache 11 can update the write pointer 211 and register the access request to the request queue 21 through the control signal of the main bus.

The controller 4 includes an interface IF2 for updating the write pointer 211 and an interface IF3 for registering the access request to the request queue 21, based on the communication standards instanced by JTAG or I2C. Before executing the test, the controller 4 sets an initial value of the access request at a testing time in the request queue 21 via the interface IF3 by controlling the write pointer 211 via the interface IF2. The controller 4 further sets the initial value in the read pointer 212 and the debug queue pointer 247.

When performing the test, in the same way as in Example 1, the diagnosis control unit 24C cuts off the access request to the request queue 21 via the main bus from the core cache 11 by transmitting the busy signal to the core cache 11. As described above, before starting the test, the controller 4 updates the write pointer 211 and sets the data for diagnosis in the request queue 21. Subsequently, when the controller 4 transmits the diagnosis request signal to the diagnosis request reception unit 241 (see FIG. 3 in Example 1) and sets the mode register of the diagnosis status unit 242, the diagnosis control unit 24C starts the test. To be specific, the request queue 21 issues the access request to the memory 3 from the entry of the relevant location according to the read pointer 212 updated by the control unit 240C of the diagnosis control unit 24C.

In Example 4, the request queue 21 retains the access request for the disturb test. The debug queue pointer 247 is prepared in the diagnosis control unit 24C. When the diagnosis control counter 243 of the diagnosis control unit 24C completes counting a predetermined number of access requests for the load test, the control unit 240C validates the control of the debug queue pointer 247, and executes the disturb test. The disturb test entails issuing, to the memory 3, the access requests via the access control unit 22 from the entry of the request queue 21, the entry being designated by the debug queue pointer 247. This method, when adopted, enables the information processing apparatus to retain all of the entries of the debug queue for the disturb test in the request queue 21.

Figure 7:
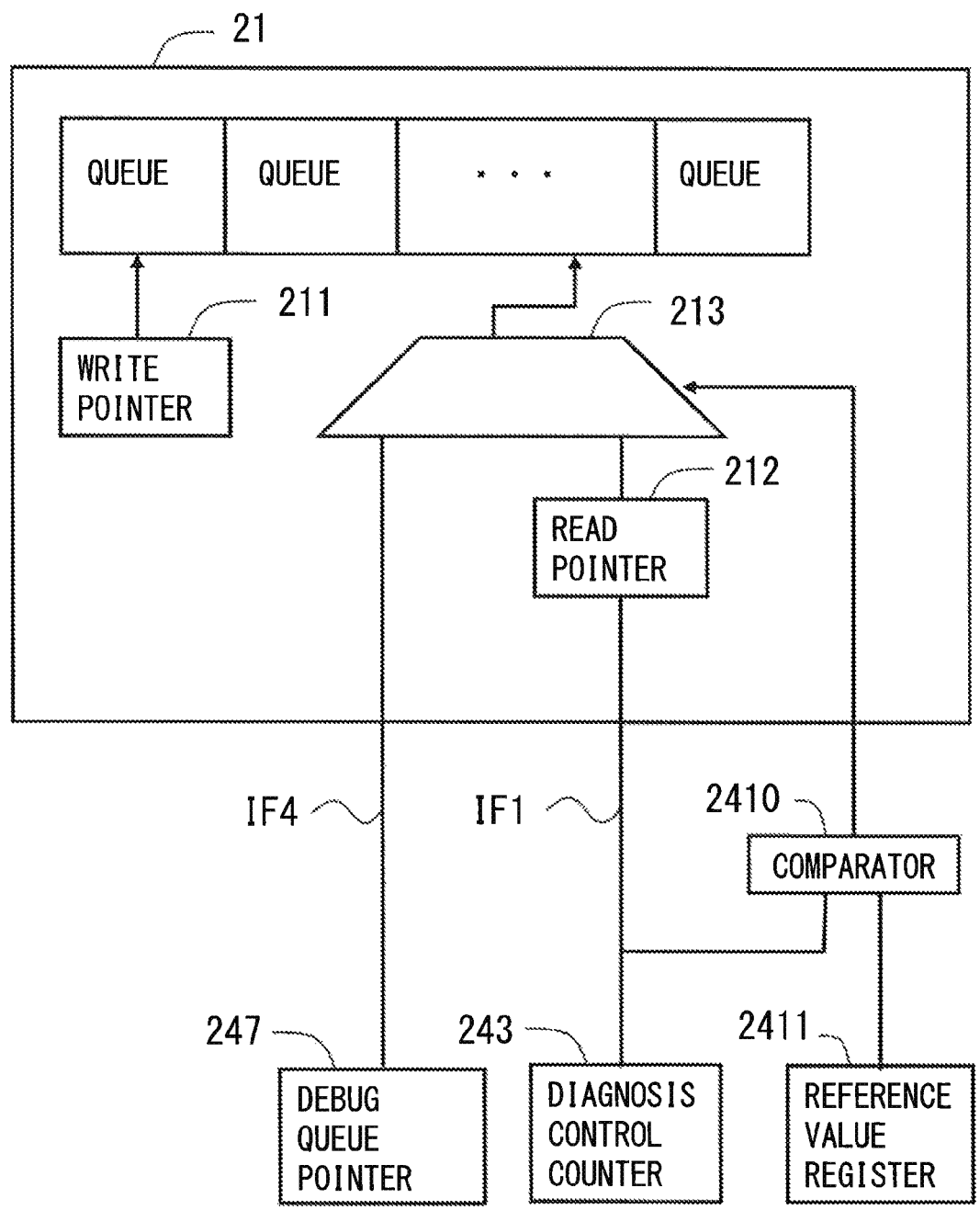
FIG. 7 is a diagram illustrating a circuit to control a switchover between a read pointer and a debug queue pointer.

FIG. 7 illustrates a circuit to control a switchover between the read pointer 212 and the debug queue pointer 247. In FIG. 7, the control signal coming from the diagnosis control counter 243 connects to the read pointer 212 via the interface IF1. A selector 213 selects the entry of the request queue 21, depending on an output signal of the read pointer 212 and an output signal of the debug queue pointer 247 via an interface IF4. It does not, however, mean that the interfaces are particularly limited to the interfaces IF1, IF4. The interfaces IF1, IF4 are sufficient if capable of connecting the diagnosis control unit 24C to the request queue 21.

The selector 213 selects, based on a comparator 2410, any one of the output signal from the read pointer 212 and the output signal from the debug queue pointer 247. The comparator 2410 compares the count value of the diagnosis control counter 243 with a reference value set in a reference value register 2411. The control unit 240C or the controller 4 in FIG. 6 sets the count values of the diagnosis control counter 243 till completing the load test in the reference value register 2411.

According to the configuration in FIG. 7, the diagnosis control counter 243 counts values up to such a count value set in the reference value register 2411 as to reach the completion of the load test, during which the selector 213 selects the entry of the request queue 212, based on the read pointer 212. On the other hand, when the count value of the diagnosis control counter 243 reaches such a count value until the completion of the load test, the count value being set in the reference value register 2411, the selector 213 selects the entry of the request queue 212, based on the debug queue pointer 247.

Note that the count value of the diagnosis control counter 243 is inputted directly to the read pointer 212 in the instance of FIG. 7 but may also be inputted to the read pointer 212 via a circuit to convert the count value by a predetermined conversion formula. The "predetermined conversion formula" is exemplified by a shift of value (addition and subtraction), multiplication and division of an integer value, and other equivalent calculations. The circuit in FIG. 7 includes the comparator 2410 and the reference value register 2411, which are provided outside the request queue 21. For instance, the comparator 2410 and the reference value register 2411 are provided in the diagnosis control unit 24C. It does not, however, mean that the request queue 21 and the diagnosis control unit 24C are not limited to the configurations in FIG. 7. For instance, the comparator 2410 and the reference value register 2411 may be provided in the request queue 21. The reference value register 2411 is provided in the request queue 21, in which case it may be sufficient that the control unit 240C sets the count value for the load test in the reference value register 2411 before performing the test.

With the entry count "dqn" of the debug queue being deficient, a specified process may be added when looping. For instance, the accesses to the addresses of the entire areas use a circuit originally as a counter enabling the instructions about the addresses of the entire areas. However, the present circuit may be contrived to add a specified value to the queue when looping in the configuration of FIG. 6. For instance, such control is assumed that the read pointer 212 or the debug queue pointer 247 counts the entries of the request queue 21 in a range from "0" to a maximum value. It may be sufficient that the access address of the access request to the memory 3, which is read according to the pointer, is shifted by a specified address interval of the memory 3 whenever the read pointer 212 or the debug queue pointer 247 counts in this control. For instance, the request queue 21 of the memory control device 20 is provided with an adder circuit to add the addresses so that all of the addresses of the memory 3 are accessed.

A data pattern for testing the memory is exemplified by a checker board pattern having a "1" status and a "0" status alternately per retaining element. This data pattern can be easily implemented by preparing an increment circuit or the adder circuit about the addresses within the request queue 21. The same is applied to an address pattern as well. Furthermore, an address scramble and a data scramble are considered as the access requests for the test, depending on the packaging method of the memory 3 itself. When adopting the method of preparing the increment circuit or the adder circuit about the addresses within the request queue 21, the data pattern can be arbitrarily generated, and hence the tests using a variety of data patterns and a variety of access patterns can be easily implemented. For instance, the data pattern may be replaced with another pattern by changing the address in the case of a test that involves exchanging the bit of the test data.

It is not easy to implement the foregoing function depending on the request given from the core cache 11. A reason why not easy is that the core cache 11 itself has none of the instructions, and hence there are buffers prepared corresponding to an amount of instructions. Instruction queues of the core can, when having sufficient areas, store the accesses of the variety of data patterns and the variety of address patterns. However, each of the processors in recent years has the plurality of cores, resulting in further increased areas. Therefore, when accessing the memory 3 from the normal core cache 11, the increment circuit or the adder circuit of the addresses is, if not used, unnecessary for the normal arithmetic process. Supposing that the increment circuit or the adder circuit is used for the normal arithmetic process, a test for the increment circuit or the adder circuit of the addresses with respect to the respective cores is conducted and becomes complicated. In other words, the implementation of the functions according to the embodiment by the requests from the core cache 11 is not acceptable in efficiency but possibly becomes complicated in design.

Figure 8:
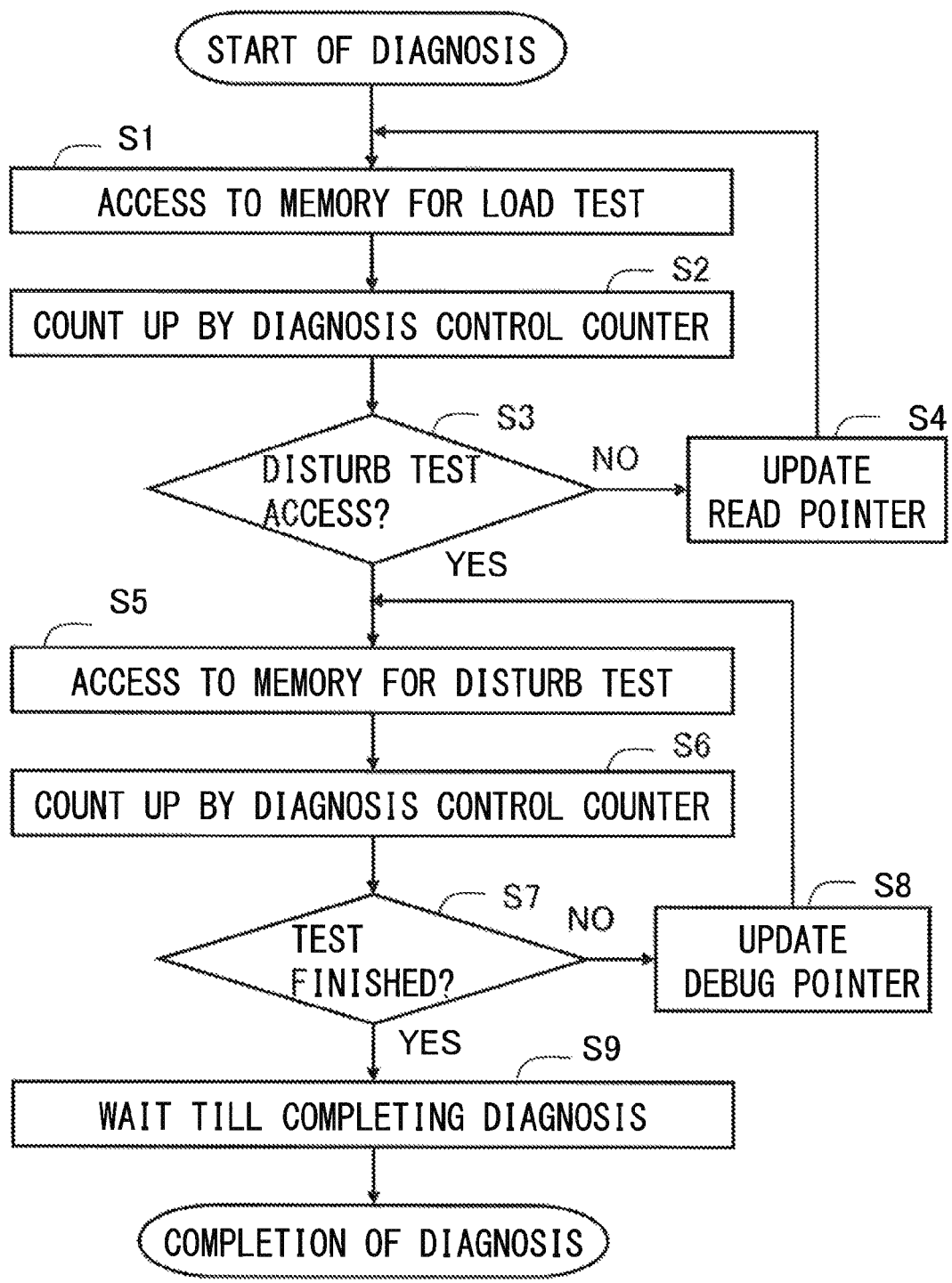
FIG. 8 is a flowchart illustrating a procedure of sending an access request when conducting a diagnosis.
Figure 9:
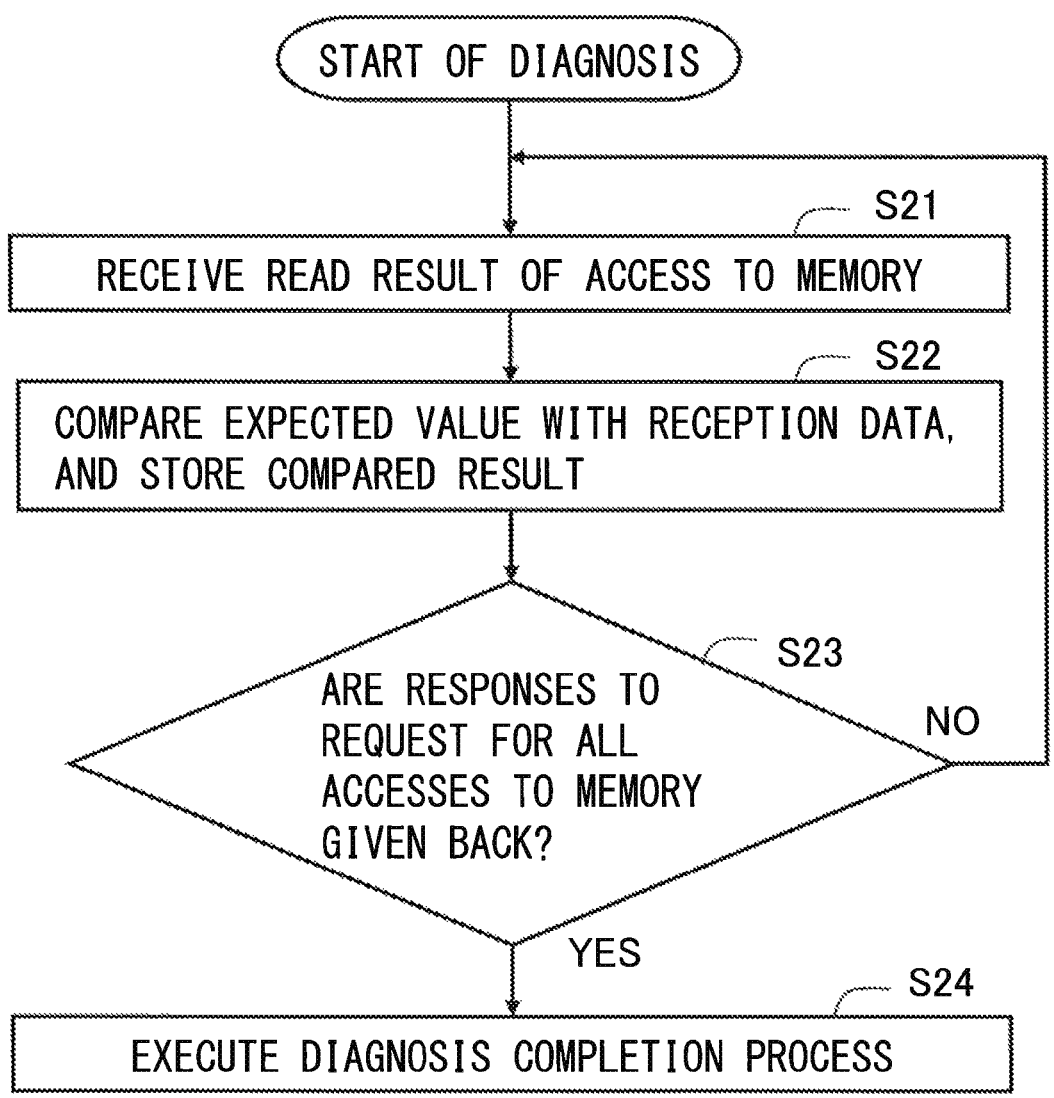
FIG. 9 is a flowchart illustrating a reception process when having a read access.

FIGS. 8 and 9 depict a control procedure of the diagnosis control unit 24C. FIG. 8 is a flowchart illustrating an access request sending procedure when executing the diagnosis of the memory 3. A start of processes in FIG. 8 is triggered by the controller 4 transmitting the diagnosis request signal to the diagnosis request reception unit 241 (see FIG. 3) and setting the mode register of the diagnosis status unit 242 in the debug mode.

The processes in FIG. 8 start with sending the access request to the memory 3 for the load test to the access control unit 22 by the control circuit of the request queue 21 from a present location of the read pointer. The access to the memory for the load test is thereby carried out (S1). To be specific, the diagnosis control unit 24C issues the access request to the memory 3 from the entry of the request queue 21, the entry being in the location indicated by the read pointer 212.

Next, the diagnosis control unit 24C counts up a value of the diagnosis control counter 243 (S2). Subsequently, the diagnosis control unit 24C determines whether the access for the disturb test is conducted or not (S3). For instance, the diagnosis control unit 24C continues the load test but does not perform the disturb test till the value of the diagnosis control counter 243 reaches a predetermined value (load test end value) (NO in S3). Then, the diagnosis control unit 24C updates the read pointer to a next location (S4), and loops the control back to the process in S1. The processes in S1 through S4 are one instance of handing over a predetermined number of requests to a memory via a request queue.

Whereas when the value of the diagnosis control counter 243 reaches the predetermined value (load test end value), the diagnosis control unit 24C starts up the access request to the memory 3 for the disturb test (S5). To be specific, the diagnosis control unit 24C issues the access request to the memory 3 from the entry of the request queue 21, the entry being in the location indicated by the debug queue pointer 247.

Next, the diagnosis control unit 24C counts up the value of the diagnosis control counter 243 (S6). Subsequently, the diagnosis control unit 24C determines whether the test is finished or not (S7). When the value of the diagnosis control counter 243 does not reach the predetermined value (test end value), the diagnosis control unit 24C updates the read pointer (S8), and loops the control back to the process in S5. Herein, the test end value is a larger than, e.g., the load test end value. The processes in S5 through S8 are one instance of further handing over a request different from the predetermined number of requests to the memory. The processes in S1 through S4 and the processes in S5 through S8 are one instance of sending an access request to a storage device to a storage control device in place of the access request to the storage device from an arithmetic processing device.

Whereas when determining in S8 that the disturb test is finished, the diagnosis control unit 24C waits till completion of the diagnosis (S9). The "completion of the diagnosis" represents completion of acknowledgment of the reception data from the memory in subsequent processes of FIG. 9

FIG. 9 is a flowchart illustrating a reception process when having a read access to the memory 3. In the process of FIG. 9, the diagnosis control unit 24C receives read data when having the read access to the memory 3 from the reception data control unit 23 (S21). Next, the diagnosis control unit 24C compares the reception data with the expected value already acquired from the controller 4. Note that the expected value already acquired from the controller 4 is registered in, e.g., an entry of the expected value retaining unit 246 (FIG. 3), the entry being associated with, e.g., the address in the memory 3.

The diagnosis control unit 24C determines whether responses to all of the access requests to the memory 3 are received or not (S23). When unreceived responses are left, the diagnosis control unit 24C loops the control back to the process in S21. The processes in S21 through S23 are one instance of acquiring a response from the storage device via the storage control device.

Whereas when determining in S23 that the responses to all of the access requests to the memory 3 are received, the diagnosis control unit 24C executes a diagnosis completion process (S24). In the diagnosis completion process, the diagnosis control unit 24C returns a diagnosis result to the controller 4 by, e.g., scan shift, and resets the mode register in the normal mode from the debug mode. The diagnosis control unit 24C negates the busy signal to the core cache 11. In the information processing apparatus, the access request to the memory 3 from the core cache 11 is registered in the request queue 21 in the process of S24.

As discussed above, in Example 4, a capacity of the request queue 21 is reduced by looping the issuance of the access request from the entry of the request queue 21 through updating the read pointer 212, thereby enabling the load test to be performed. Similarly, the access request for the disturb test can be issued by providing the debug queue pointer 247 while diverting the entries of the request queue 21.

The diagnosis control unit 24C in Example 4 can repeat counting the value of the read pointer 212 or the debug queue pointer 247 in the range from the minimum value (0) to the maximum value a plural number of times. As a result, the diagnosis control unit 24C in Example 4 can execute the load test or the disturb test by using a larger number of access requests than the diagnosis data count set in the request queue 21.

The configuration of Example 4 is the same as those of Example 1 through example 3 in terms of such a point that the diagnosis control unit 24C accesses the request queue 21 independently of the core cache 11 and issues the access requests to the memory 3 for the load test and the disturb test. Hence, the diagnosis control unit 24C in Example 4, similarly to Example 1 through Example 3, can package the circuit to perform the disturb test, the load test and other equivalent tests in the information processing apparatus while reducing the degree of how much the operation of the processor or the cache is affected even when the behavior of the processor or the cache is complicated by, e.g., mounting the plurality of cores, diversifying the cache, diversifying the function of the interconnect between the plural processors, and other equivalent schemes.

In Example 4, the diagnosis control unit 24C can perform the load test for the memory 3 by controlling the read pointer 212 with a simpler configuration than in Example 1 through Example 3. Further in the diagnosis control unit 24C of Example 4, the diagnosis control counter 243 counts a transmission count of the access requests to the memory 3 that are equivalent to the access requests for the load test, and thereafter the selector 213 selects the entry of the request queue 21 with a count value counted by the debug queue pointer 247. With the configuration and the processes described above, the diagnosis control unit 24C can execute the disturb test by using the entries of the request queue 21.

OTHER MODIFIED EXAMPLES

In Example 1 through Example 4, each of the diagnosis control units 24, 24A, 24B, 24C is provided in the memory control device 20. It does not, however, mean that the present information processing apparatus is limited to the configurations of Example 1 through Example 4. For instance, the diagnosis control units 24, 24A, 24B, 24C may be provided outside the memory control device 20. When the diagnosis control units 24, 24A, 24B, 24C are provided outside the memory control device 20, the transmission paths for accessing the request queue 21 from the diagnosis control units 24, 24A, 24B, 24C may be provided between the diagnosis control units 24, 24A, 24B, 24C and the request queue 21. For instance, in FIG. 2 of Example 1, the transmission paths leading to the selectors 25, 26 and the transmission path of the request control signal for diagnosis may be provided in extension from the diagnosis control unit 24 to the request queue 21. In FIG. 7 of Example 4, the transmission paths of the output signals of the diagnosis control counter 243, the debug queue pointer 247 and the comparator 2410 may be formed in extension from the diagnosis control unit 24C to the request queue 21.

The information processing apparatus including the arithmetic processing device and the storage device enables the storage device to be tested simply and efficiently even in the case of complicated configurations of the arithmetic processing device and the storage device or a complicated interface between the arithmetic processing device and the storage device.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. An information processing apparatus comprising:
an arithmetic processing device configured to output an access request;
a storage device configured to store data;
a storage control device configured to accept the access request to the storage device from the arithmetic processing device, transfer the accepted access request to the storage device, and acquire a response to the access request from the storage device;
a diagnosis control device configured to send an access request to the storage device in place of the access request to the storage device from the arithmetic processing device, and to acquire a response from the storage device via the storage control device; and
a first selector configured to select any one of the access request sent from the storage control device and the access request sent from the diagnosis control device, and hand over the selected access request to the storage device, wherein the diagnosis control device controls the selection of the first selector and retains the access request to be sent from the diagnosis control device and to be handed over to the storage device via the first selector.

2. The information processing apparatus according to claim 1, wherein the storage control device includes a request queue configured to retain a plurality of access requests in accordance with predetermined priority levels, and a branch path configured to hand over the access requests retained in the request queue to the storage device in accordance with the predetermined priority levels and return the access requests to a head of the request queue.

3. The information processing apparatus according to claim 1, wherein
the storage control device includes a request queue configured to retain a plurality of access requests in accordance with predetermined priority levels, and a read pointer configured to designate a read location of a request queue configured to hand over the access request to the storage device from the request queue, and
the diagnosis control device includes an interface to update the read pointer.

4. The information processing apparatus according to claim 3, wherein the diagnosis control device hands over a predetermined number of access requests to the storage device through the request queue by looping and thus updating the read pointer, and further, after handing over the predetermined number of access requests, hands over access requests different from the predetermined number of access requests to the storage device.

5. The information processing apparatus according to claim 1, further comprising:
a second selector configured to select any one of the access request sent from the arithmetic processing device and the access request sent from the diagnosis control device, and hand over the selected access request to the storage control device,
wherein the diagnosis control device controls the selection of the second selector and retains the access request to be sent from the diagnosis control device and to be handed over to the storage control device via the second selector.

6. An information processing apparatus comprising:
an arithmetic processing device configured to output an access request;
a storage device configured to store data;
a storage control device configured to accept the access request to the storage device from the arithmetic processing device, transfer the accepted access request to the storage device, and acquire a response to the access request from the storage device;
a diagnosis control device configured to send an access request to the storage device via the storage control device in place of the access request to the storage device from the arithmetic processing device, and to acquire a response from the storage device via the storage control device; and
a second selector configured to select any one of the access request sent from the arithmetic processing device and the access request sent from the diagnosis control device, and hand over the selected access request to the storage control device, wherein the diagnosis control device controls the selection of the second selector and retains the access request to be sent from the diagnosis control device and to be handed over to the storage control device via the second selector.

7. A control method of an information processing apparatus including an arithmetic processing device and a storage device configured to store data, the control method comprising:

outputting an access request by the arithmetic processing device;

accepting the access request to the storage device from the arithmetic processing device by a storage control device included in the information processing apparatus;

transferring the accepted access request to the storage device by the storage control device;

acquiring a response to the access request from the storage device by the storage control device;

sending an access request to the storage device in place of the access request to the storage device from the arithmetic processing device, and acquiring a response from the storage device via the storage control device by a diagnosis control device;

selecting any one of the access request sent from the storage control device and the access request sent from the diagnosis control device by a first selector; and handing over the selected access request to the storage device by the first selector, wherein the diagnosis control device controls the selection of the first selector and retains the access request to be sent from the diagnosis control device and to be handed over to the storage device via the first selector.

8. A control method of an information processing apparatus including an arithmetic processing device and a storage device configured to store data, the control method comprising:

outputting an access request by the arithmetic processing device;

accepting the access request to the storage device from the arithmetic processing device by a storage control device included in the information processing apparatus;

transferring the accepted access request to the storage device by the storage control device;

acquiring a response to the access request from the storage device by the storage control device;

sending an access request to the storage device via the storage control device in place of the access request to the storage device from the arithmetic processing device, and acquiring a response from the storage device via the storage control device by a diagnosis control device; and selecting any one of the access request sent from the arithmetic processing device and the access request sent from the diagnosis control device by a second selector; and handing over the selected access request to the storage control device by the second selector, the diagnosis control device controls the selection of the second selector and retains the access request to be sent from the diagnosis control device and to be handed over to the storage control device via the second selector.

* * * * *